W. E. GREENAWALT.
PROCESS OF EXTRACTING COPPER FROM ITS ORES.
APPLICATION FILED SEPT. 30, 1912.
1,180,844.
Patented Apr. 25, 1916.
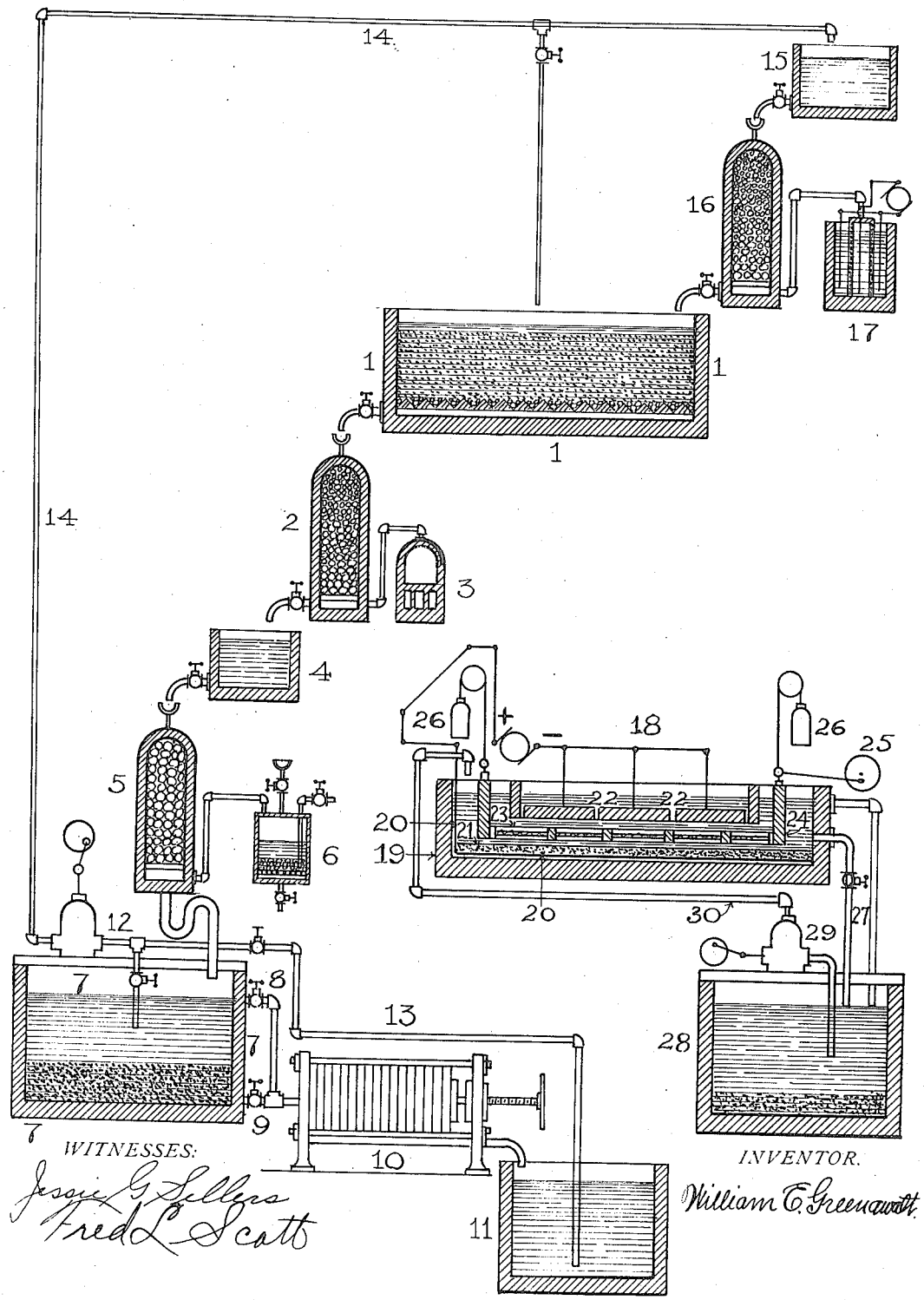

UNITED STATES PATENT OFFICE.

WILLIAM E. GREENAWALT, OF DENVER, COLORADO.

PROCESS OF EXTRACTING COPPER FROM ITS ORES.

1,180,844.　　　Specification of Letters Patent.　　Patented Apr. 25, 1916.

Application filed September 30, 1912. Serial No. 723,211.

*To all whom it may concern:*

Be it known that I, WILLIAM E. GREENAWALT, a citizen of the United States, residing in the city and county of Denver and the State of Colorado, have invented certain new and useful Improvements in Processes of Extracting Copper from Its Ores, of which the following is a specification.

My invention relates to processes of extracting copper from its ores, and has for its more immediate objects the cheap precipitation of the copper with the simultaneous regeneration of acid in amounts sufficient for a cyclic process, and the overcoming of the difficulties of the foul solutions in converting the copper into its metallic condition by electrolysis.

The process is applicable to any ore not containing too much lime. If the ore is a sulfid it should be roasted, but this is not imperative, but for this description of the process the ore may be considered as being in the oxidized condition. It is then treated with a chlorid solution, preferably an acid chlorid solution, by means of which the copper is extracted as the chlorid, principally as cupric chlorid, although some cuprous chlorid may also be present. The chlorid solution is then filtered from the ore and treated with sulfur dioxid, whereby the cupric chlorid is converted into cuprous chlorid, and acid regenerated according to the following equation;

(1). $2CuCl_2 + SO_2 + 2H_2O = 2CuCl + H_2SO_4 + 2HCl$.

Hydrogen sulfid is then applied to the solution and the cuprous chlorid precipitated as the sulfid, with a further regeneration of acid. The reaction is;

(2). $2CuCl + H_2S = Cu_2S + 2HCl$.

Similarly, if there is silver or gold in the solution;

(3). $2AgCl + H_2S = Ag_2S + 2HCl$.
(4). $2AuCl_3 + 3H_2S = Au_2S_3 + 6HCl$.

It will be seen, in the reduction of the cupric chlorid, that three molecules of acid are regenerated by the use of sulfur dioxid, and two molecules at the expense of hydrogen sulfid. The advantage of this method of procedure is evident when compared with the precipitation of the copper direct with hydrogen sulfid. If copper is precipitated direct from the cupric chlorid, with hydrogen sulfid, the reaction is;

(5). $CuCl_2 + H_2S = CuS + 2HCl$.

From this it is evident that 1 part of hydrogen sulfid will precipitate 1.87 parts of copper, with a regeneration of the combined, or two molecules of acid. By the indirect method of my process, twice the amount of copper, or 3.74 parts, are precipitated with 1 part of hydrogen sulfid, with the regeneration of one molecule of sulfuric and three molecules of hydrochloric, acid; or in other words with a regeneration of 2½ times the amount of acid by ordinary hydrogen sulfid precipitation. For every pound of copper precipitated with hydrogen sulfid from cupric chlorid 1.14 pounds of hydrochloric acid is regenerated, whereas with my process, 3.2 pounds of acid are regenerated. The advantage of this method of procedure is evident. Sulfur dioxid is usually a waste product from roasting sulfid ores, and the expense of its use in this connection is practically *nil*, while hydrogen sulfid is more or less expensive to manufacture and therefore, this expense is reduced by at least fifty per cent. Further, by the direct use of hydrogen sulfid, only the amount of acid combined with the copper is regenerated, and hence such a process of precipitation, by itself, would not furnish enough acid to make the process self sustaining, since in all ores, more acid is consumed than that combined with the copper, and the amount of this excess consumption is dependent upon the other constituents of the ore, usually the lime. In my process, with a regeneration of at least 2½ times the combined acid, the latitude of self sustaining operation is immeasurably increased, and will usually be within reach of all copper ores amenable to leaching processes. The advantages of the process, however, are still more marked, due to other considerations; the lixiviant will contain other byvalent salts in solution besides the copper, notably iron chlorid, which may be in the ferric or ferrous condition. If hydrogen sulfid is applied to the solution containing ferric chlorid, the ferric chlorid is reduced to the ferrous chlorid at the expense of the expensive hydrogen sulfid; thus;

(6). $2FeCl_3 + H_2S = 2FeCl_2 + 2HCl + S$ and hence a large excess of hydrogen sulfid may be required over that combining with the precipitation of the copper. The same result can be accomplished with the inexpensive sulfur dioxid, thus;

(7). $2FeCl_3 + SO_2 + 2H_2O = 2FeCl_2 + H_2SO_4 + 2HCl$, so that by my process all the wasteful use of precipitant is confined to the sulfur dioxid, and the copper may be precipitated quantitatively from the cuprous chlorid with the hydrogen sulfid.

The regenerated acid solution, due to the action of the reducing agents sulfur dioxid and hydrogen sulfid, may contain free hydrogen sulfid and iron in the ferrous condition. It may be desirable, especially if there is silver in the ore, to convert the ferrous chlorid into the ferric chlorid, which acts more energetically on the silver, the copper, and other metals. Similarly if there is gold in the ore worth recovering, it is desirable to have free chlorin in the chlorid solution. The ferrous iron may be converted into the ferric condition by means of chlorin, heating the solution and blowing in air, or by other oxidizing processes. If free chlorin is used, it is best produced by electrolysis from common salt.

The precipitated copper is in the form of sulfid; as such, it is not in condition for immediate use. The sulfid precipitate may be treated in various ways to convert it into metallic copper, but I prefer the following electrolytic method, as a subsequent step in the previous treatment, and for which the previous treatment may be regarded as a preparation, and presents marked advantages, as will now be pointed out.

In the electrolysis of copper solutions derived from leaching the ore direct, the solution, if used cyclically as I purpose, soon becomes foul and certain deleterious results are sure to follow in direct electrolytic deposition. The impurities are cumulative, and as more impurities accumulate in the solution the electrolysis becomes more difficult, and steps should be taken to purify the solution, which in such cases, is also the electrolyte. In my process these difficulties are overcome by first precipitating out the copper, then separating the regenerated acid solution from the precipitate, and then carefully washing the precipitate and electrolyzing it with an electrolyte separate and distinct from the lixiviant.

The sulfid precipitate obtained by hydrogen sulfid precipitation from an acid solution is quite pure, and certainly free from iron and zinc, and the more deleterious elements. There is not the same objections, therefore, to electrolyzing the precipitate direct as to electrolyzing copper matte, which consists largely of iron sulfid and other deleterious elements.

The precipitate may be electrolyzed raw or roasted, but in any case, it is preferably used as the anode, for the reason that no injurious impurities are introduced into the electrolyte through the precipitate, and for the reason the necessary power is very materially less than when the copper is deposited from its solutions with insoluble anodes. The theoretical E. M. F. for the decomposition of copper sulfate with insoluble anodes is 1.2 volts, whereas in the electrolysis of the sulfid precipitate, it is only about one sixth of that amount, and for the electrolysis of the precipitate after roasting it to oxid and using a sulfate electrolyte, it is even less than for the sulfid. Usually the electrolysis of the sulfid with a sulfate solution will be preferred and using the precipitate as an anode. It is quite possible to also electrolyze it as the cathode. If the sulfid precipitate is electrolyzed as the anode, pure copper will be deposited at the cathode and elemental sulfur left behind. If the sulfid precipitate is first roasted to oxid or sulfate, sulfur dioxid will be given off in the precess. In any event, whether the sulfur is recovered in its elemental form by electrolysis, or the sulfid precipitate roasted, the sulfur may be reused in the process, either as hydrogen sulfid or sulfur dioxid, and in this way used cyclically and indefinitely.

The process may be more specifically described by referring to the accompanying drawing, in which 1 represents a leaching vat, agitator, or other receptacle for treating the ore with an acid solution, preferably an acid chlorid solution. After the ore is sufficiently treated the solution, containing the copper mostly as the cupric chlorid, is filtered from the gangue and treated with sulfur dioxid in the reducing tower, 2, in which the solution is preferably subdivided to facilitate the reactions as set forth in equations 1 and 7, by means of which the copper, iron, and other salts are reduced to their lowest valency. If free chlorin is present it is reduced to hydrochloric acid. From the tower 2, the reduced solution, now containing the copper as cuprous chlorid, and also containing considerable free acid, flows into storage and regulating tank 4, and from there it is drawn in a regular and continuous stream into the precipitating tower 5, where the copper is precipitated with hydrogen sulfid and more acid regenerated, as set forth in equation 2, and the silver and gold as set forth in equations 3 and 4.

6 represents the apparatus for producing the hydrogen sulfid, which may be accomplished by any of the ordinary methods.

From the precipitating tower 5, the precipitated solution now containing the precipitate in suspension, flows into the settling tank 7, where the sulfid precipitate settles to the bottom and accumulates until its removal is desirable. If the supernatant regenerated acid solution is free from suspended matter, as will be the case if sufficient time is allowed to settle, it may be pumped by means of the pump 12 either directly back to the leaching vat or into the storage tank 15. It will usually be found better to filter the precipitated and regenerated solution, as through a filter press 10, when all suspended matter will be caught in the press and the clear solution flowing into tank 11 may be pumped to tank 15 by means of the pump 12, through the pipe line 14.

The regenerated acid solution in tank 15 will contain all its salts at their lowest valencies, and possibly also some hydrogen sulfid, and in this condition it is not advisable to apply it to the ore, especially if any chemical reaction is desired from the salts in solution with the copper in the ore. In order to make the solution most effective, it is oxidized, or the valency of the salts raised by introducing chlorine into tower 16, where air, chlorin, or other oxidizing reagents may be most effectively applied to the solution. If there is gold in the ore, or if free chlorin is desired in the solution to act on the silver or for other purposes, it is preferably generated by electrolysis from common salt, in the electrolyzer 17, which may also represent an apparatus for producing oxidizing reagents, such as ozone, etc. The solution now brought to its highest state of efficiency, is again returned to the ore, to complete another cycle, and the operation continued indefinitely.

If the solution remained in contact with the ore to be completely neutralized, and if it were at once precipitated with hydrogen sulfid without the previous application of sulfur dioxid to regenerate free acid, there would be danger of getting a base precipitate, but from an acid solution, hydrogen sulfid precipitates only the metals of the first and second analytical groups, so that the precipitate will always be quite pure no matter how impure the solution may be.

The precipitate accumulates in tank 7 until its removal is desirable. The acid solution is then drained from it as completely as possible, and the precipitate washed and filtered. It is then treated, preferably as follows, largely with a view of reusing the sulfur either for the production of sulfur dioxid or hydrogen sulfid, to get pure copper, and to greatly reduce the cost of electrolysis.

The precipitate, after thorough washing, is filtered and treated in the electrolyzer 18, in which 19 represents the electrolyte tank having preferably a lead sheet 20, called the insoluble anode, covering the entire bottom of the tank. On this lead sheet is placed the precipitate 21, either raw or roasted, preferably raw. Above the anode is placed the cathode 22, which is stationary, and consists of fairly thick sheets of copper, coated with a graphite or paraffin paint, so that the deposited copper may be readily stripped from the cathode sheet when it becomes of sufficient thickness to make its removal desirable. Interposed between the anode and cathode, is a suspended diaphragm 23, supported by the anode bell 24, and arranged to oscillate by means of the mechanism 25. The vertical position of the diaphragm between the electrodes is adjusted by means of the counter weights 26. In treating the precipitate, it is charged evenly on top of the lead plate 20 in the bottom of the electrolyte tank, the diaphragm oscillated, and the current turned on. If the precipitate is in the form of sulfid, copper will be deposited on the cathode 22 and sulfur liberated from the precipitate, and if provision were not made to remove it the same difficulty would arise in this process that has hitherto been fatal in the electrolysis of copper matte, since it would act as an insulator, and the E. M. F. required to carry on the electrolysis would be prohibitive. By the oscillation of the diaphragm the anolyte and catholyte are agitated as much as desired, so that the copper is evenly and firmly deposited on the cathode and the sulfur, which is lighter than the copper precipitate, is by the same agitation brought into suspension in the electrolyte and removed as rapidly as formed through the pipe 27, and flows into tank 28, where the sulfur settles out, and the clear solution is then returned to the electrolyte tank 19, through the pump 29, and the pipe line 30. In this way the circulation is kept up, the sulfur being continuously removed from the electrolyzer by the oscillating diaphragm, which at the same time prevents any impurities in suspension from getting to the cathode or precipitated copper.

If it were not for the oscillating diaphragm and agitation were resorted to sufficiently to remove the sulfur in suspension, the deposited copper would be so impure as to be worthless without further refining. The object of the oscillating diaphragm is four fold; to agitate the electrolyte and thus get a higher efficiency and a better deposit; to prevent polarization; to remove the insoluble precipitate residue from the electrolyzer, and beyond the influence of the current as rapidly as formed; and to prevent any suspended impurities from getting to the anode. In this way the copper precipitate may also be cheaply separated from any contained precious or other metals. If the metals are heavy they may be found in the anode sludge on the lead plate after the copper has been transferred to the cathode. In this work a sulfate electrolyte is preferred, because a perfect separation of the copper and the impurities or precious metals is in this way possible.

In treating the ore with a chlorid solution the copper, silver, gold, and lead, may be simultaneously extracted. By the treatment with sulfur dioxid the copper is reduced to the cuprous chlorid, the gold to metal, while the silver and lead may remain unaffected. In the precipitation with hydrogen sulfid the copper, silver, and lead will be precipitated as the sulfids, and all these metals, including the gold, will be in the precipitate.

In the electrolyzer the copper will be deposited on the cathode, the sulfur removed in suspension from the electrolyzer if the sulfid precipitate is treated raw, and the gold, silver, and lead will be found in the anode sludge, which may be subsequently refined to recover the respective metals separately. The sulfur is accumulated, and reconverted into the precipitant, either as sulfur dioxid or hydrogen sulfid. If sulfur dioxid, it is ignited in the burner 3, and used in tower 2; if hydrogen sulfid, it is fused with iron to produce iron sulfid, which on the application of acid, will release hydrogen sulfid in the generator 6, which may be used in the precipitating tower 5, and in this way the sulfur may be repeatedly and cyclically used as often as desired. No matter how the sulfur is used, it is not at all necessary to make a close separation, or even any separation at all, for if the sulfur is burned to sulfur dioxid, or used in the production of hydrogen sulfid, the residue is recovered and treated for the valuable metals. So that, if desired, the sulfur, silver, gold, lead, and other valuable metals may all be removed from the electrolyzer together, and the metals subsequently recovered.

In the treatment of the ore with a chlorid solution, it is desirable to maintain sufficient other chlorids in the solution to retain the cuprous chlorid in solution, since cuprous chlorid is not soluble in water or sulfate solutions. My process, however, may also be used for sulfate solutions, and has an advantage in saving hydrogen sulfid, by reducing the valency of the salts before applying the hydrogen sulfid precipitant.

Manifestly, the precipitate may be charged into the electrolyzer without interrupting the electrolysis. The rate at which the electrolyte is circulated will depend largely on the rate of removal of the sulfur.

The method described of treating the sulfid precipitate to recover the metallic copper and convert the sulfur into a precipitant for reuse is the one preferred, but I do not want to be understood as limiting the process or claims to it.

I claim:

1. A process of extracting copper from its ores which consists in treating the ore with a chlorid solution to dissolve the copper; separating the solution from the gangue; treating the copper solution with sulfur dioxid to convert the cupric chlorid to the cuprous chlorid and regenerate acid; then treating the solution with hydrogen sulfid to precipitate the copper as sulfid and regenerate more acid; separating the regenerated acid solution from the sulfid precipitate, and returning it to the ore.

2. A process of extracting copper from its ores which consists in treating the ore with a chlorid solution to dissolve the copper; separating the solution from the gangue; treating the copper solution with sulfur dioxid to convert the cupric chlorid into the cuprous chlorid and regenerate acid; then treating the solution with hydrogen sulfid to precipitate the copper as sulfid and regenerate more acid; separating the regenerated acid solution from the sulfid precipitate; treating it to raise the valency of the bivalent elements in the solution, and then returning the solution to the ore to repeat the cycle.

3. A process of extracting copper from its ores which consists in treating the ore with a chlorid solution to dissolve the copper; separating the solution from the gangue; treating the copper solution with a reagent capable of converting the cupric chlorid into the cuprous chlorid; then treating the solution with hydrogen sulfid to precipitate the copper as sulfid; separating the regenerated solution from the sulfid precipitate, and returning the solution to the ore to pass through another cycle.

4. A process of extracting copper from its ores which consists in treating the ore with a chlorid solution to dissolve the copper; separating the copper solution from the gangue; treating the copper solution with sulfur dioxid to convert the cupric chlorid into the cuprous chlorid and regenerate acid; maintaining sufficient other chlorids in the solution to retain the cuprous chlorid in solution; treating the solution with hydrogen sulfid to precipitate the copper as sulfid and regenerate more acid; separating the regenerated acid solution from the sulfid precipitate, and returning the regenerated acid solution to the ore to pass through another cycle.

WILLIAM E. GREENAWALT.

Witnesses:
 FRED. L. SCOTT,
 HENRY F. SELLERS.